Dec. 26, 1933.          O. NAEF                 1,941,444
                   POTENTIOMETER SYSTEM
                   Filed Aug. 26, 1931          3 Sheets-Sheet 1

Inventor
Otto Naef
by Alfred H. Dyson
Attorney

Dec. 26, 1933.   O. NAEF   1,941,444
POTENTIOMETER SYSTEM
Filed Aug. 26, 1931   3 Sheets-Sheet 3

Inventor
Otto Naef
by Alfred H. Dyson
Attorney

Patented Dec. 26, 1933

1,941,444

UNITED STATES PATENT OFFICE 1,941,444

POTENTIOMETER SYSTEM

Otto Naef, Haddonfield, N. J., assignor to Allis-Chalmers Manufacturing Company, Milwaukee, Wis., a corporation of Delaware Application August 26, 1931. Serial No. 559,376

17 Claims. (Cl. 171—119)

This invention relates to improvements in means for obtaining a current from an A. C. source at a voltage different from the voltage of the source.

In the utilization of electrical energy it is often desired to produce electrical energy at one voltage and transmit it at another voltage or, where a source of electrical energy is available, it is often desired to draw energy from the source at a voltage either higher or lower than that of the source. Such different voltages are usually obtained by means of electro-magnetic transformers which are generally found reasonable in cost and satisfactory in operation for the majority of ranges of voltages and outputs required. For a certain number of applications however, transformers are not found satisfactory; thus if it is desired to draw a limited amount of energy at low voltage from a high voltage transmission line, the cost of the transformer will be excessive on account of the large amount of insulation required. It may also be desired to obtain high voltages at low power from a source of low voltage supply in which case it is again necessary to build a transformer having a high degree of insulation between the low voltage and the high voltage windings. Means other than transformers, have been proposed such as the so-called synchronizing bushings, which are however capable of delivering only very small amounts of energy and are of practical application only where the bushings are already needed for insulating purposes.

It has also been proposed to obtain energy at low voltage from a high voltage supply line by a potentiometer arrangement in which case the voltage obtained from the potentiometer is usually dependent upon the amount of energy drawn from the line. This presents the disadvantage of requiring adjustment of the potentiometer in function of the load and the danger of causing excessive voltages to appear which are however capable of delivering only very small amounts of energy and are of practical application only where the bushings are already needed for insulating purposes.

It has also been proposed to obtain energy at low voltage from a high voltage supply line by a potentiometer arrangement in which case the voltage obtained from the potentiometer is usually dependent upon the amount of energy drawn from the line. This presents the disadvantage of requiring adjustment of the potentiometer in function of the load and the danger of causing excessive voltages to appear across some of the potentiometer elements for certain values of the load circuit. It has been found that, if the potentiometer is formed from three reactive elements which are in definite relation, it is possible to obtain an output voltage independent of the load. It has also been found that, if the potentiometer is formed from four reactive elements, three of which are in definite relation to each other, the fourth being in definite relation to the other three and to the load impedance, it is possible to obtain an output voltage independent of the load and to limit the voltage across the elements of the potentiometer to any desired range of values.

It is accordingly one of the objects of the present invention to provide a system whereby a source of alternating current at a certain voltage is capable of supplying current at a voltage different from that of the source without the use of transformers.

Another object of the invention is to provide a system in which the ratio of the input and output voltages and the phase angle between the voltages will be substantially independent of the load.

Another object of the invention is to provide a system in which the voltages across the different elements will be limited to a definite range of values.

Another object of the invention is to provide a potentiometer system for obtaining a voltage different from the voltage of a source in which the different elements of the potentiometer are reactive, at least one of the elements being an inductance and at least one of the elements being a capacitance.

Another object of the invention is to provide a potentiometer connection for obtaining voltages different from the voltage of a source in which the potentiometer connections are such that the electrical values of the elements comprising the same are only dependent on the potentiometer ratio of transformation, but independent of the characteristic of the output or load circuit of the potentiometer.

Another object of the invention is to provide maximum useful output, either constant or variable, at constant primary voltage without exceeding certain limits of the voltages across the steps.

Objects and advantages other than those above set forth, will be apparent from the following description when read in connection with the accompanying drawings in which Figure 1 shows a general diagram of connections for a potentiometer performing the functions of a step-down transformer, Fig. 2 shows a general diagram of connections for a potentiometer performing the functions of a step-up transformer, Figs. 3, 4, 4a, 4b, 4c and 5 are diagrams illustrating six of the possible connection arrangements of the inductances and capacitances forming a potentiometer which is shown in a general way in Fig. 1. The connections are particularly suitable when one pole of the circuit carrying the higher potential is grounded.

Fig. 6 shows a potentiometer arrangement particularly applicable when the two poles of the circuit carrying the higher potential are not grounded, as for instance two insulated phases of a three-phase circuit.

Fig. 7 diagrammatically shows one mechanical construction of a potentiometer arrangement such as shown in Fig. 5.

Figure 1:
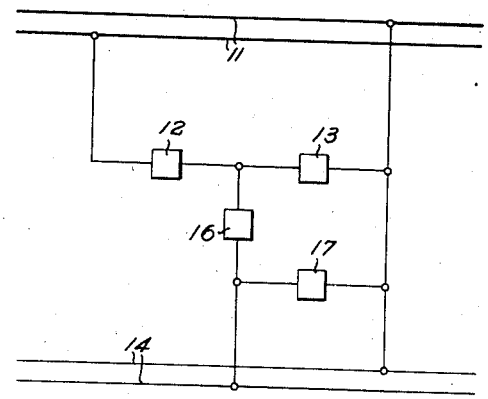

Referring more particularly to the drawings by characters of reference, the reference numeral 11 designates an electric supply line connected to an alternating current source (not shown). The source supplies substantially sine wave current at a substantially constant frequency and will be maintained at a constant voltage if it is desired to obtain constant voltage from the low voltage side of the potentiometer, or the source of current may be at a variable voltage if it is desired to obtain variable voltage from the potentiometer or to use the potentiometer for the purpose of measuring the voltage of the supply line. Reactive elements 12 and 13 are connected in series across the supply line 11, the low voltage output circuit of the potentiometer being connected across element 13 through another element 16, the output circuit being bridged by a fourth element 17. Elements 12, 13, 16 and 17 are reactive, at least one of the elements 12, 13 or 16 being an inductance and at least one of the elements being a capacitance. The purpose of elements 12 and 13 is to divide the voltage of line 11 into two portions, the portion impressed upon the element 13 being then tapped and connected to the potentiometer output line 14. Element 16 is introduced for the purpose of obtaining the desired regulation and element 17 is introduced for the purpose of limiting the voltage across the other elements to definite values for certain values of the load connected to line 14. It is understood that each element may be made up of a plurality of capacitances and inductances in any arbitrary connection, the resulting reactance of the aggregation being the only value to be considered. The sole purpose of element 17 is to draw an inductive or capacitive current which will bring the potentiometer output current to within a range giving the lowest possible impressed voltage on elements 12, 13 or 16.

It is first assumed that no load is drawn from line 14 whereupon the voltage of line 11 will be divided into two portions which are in phase coincidence or in phase opposition and in a ratio porportional to the ratio of the reactance of elements 12 and 13. If elements 12 and 13 are of the same character, such as two capacitances or inductances, their voltage will be in phase coincidence and their arithmetic sum will be equal to the voltage of line 11. If one of the elements is an inductance and the other is a capacitance, their voltage will be in phase opposition and their arithmetic difference will be equal to the voltage of line 11. For all practical purposes the above connections producing a phase opposition can be changed to produce phase coincidence by crossing the leads connecting element 13 to the output circuit. If an attempt is now made to draw current through the connections across element 13 the above described voltage distribution will be disturbed and a constant output voltage will no longer be obtained with a constant supply voltage, the output voltage then being no longer a measure of the supply voltage. To obviate this disadvantage the elements 12, 13 and 16 are so dimensioned that their inductive (positive) reactance and capacitive (negative) reactance conform to the equation $$X_{12}X_{13}+X_{13}X_{16}+X_{16}X_{12}=0$$

a compensated circuit will then be established so that, no matter what the magnitude and the phase angle of the current circulating in the potentiometer output circuit, the voltage of line 14 will remain in the same proportion to the voltage of line 11 and in exact phase coincidence or in exact phase opposition therewith. The above relation is exact for ideal elements without any losses but its accuracy will be affected by the losses in elements 12, 13, 16 and 17 which must therefore be maintained at a very low value.

In a potentiometer of the type described, an increase in load is generally followed by an increase in voltage across reactances 13 and 16 and depending on power factor, and the value of reactance 17 in a decrease or increase of the voltage across the reactance 12. The potentiometer is the better utilized the more output it can deliver without exceeding certain limiting voltages which are permissible for the individual steps. It is also desirable that changes in load within the permissible range do not require an adjustment of the potentiometer in order to prevent the step voltages from assuming dangerous values. Such increase of utilization and control of step voltages is afforded by a proper choice of the reactance 17. It has been found that, for any type of load, (expressed by an impedance Z, a reactance X and a resistance R) a minimum value of the step voltage $E_{13}$ across reactance 13 is obtained, if the reactance $X_{17}$ is dimensioned according to the following formula $$X_{17}=-X_{16}\frac{Z^2}{Z^2+X_{16}}$$

In this case the step voltage $E_{13}$ assumes the value $$E_{13}=\frac{E-14}{Z^2}X_{16}R=\frac{E-14}{Z}X_{16}\cos a$$

and is directly proportionate to the load current and to the power factor $\cos a$ of the load. This adjustment of reactance 17 therefore provides maximum possible output of the potentiometer for a certain limiting value of $E_{13}$.

The step voltage $E_{12}$ across reactance 12 assumes the value $$E_{12} = \sqrt{E_{11}^2 + E_{13}^2}$$

and $X_{12}$ must therefore be designed for this voltage. If, as often is the case, $E_{13}$ is small in comparison to $E_{11}$, the step voltage $E_{12}$ is very nearly equal to the voltage $E_{11}$ of the source in which case no extra insulation for the reactance 12 is required. It is generally necessary to design the reactance 12 for the full voltage of the source, in order to avoid damage to the reactance if protective devices associated with reactance 13 or the output circuit operate, or in case a point between reactance 12 and 13 becomes grounded.

In case of variable loads which would require a constant adjustment of reactance 17 to maintain the above relation reactance 17 may be split up into two parts of which the first (which may be designated as $X_{17'}$) equals the negative value of reactance 16 or $$X_{17'} = -X_{16}$$

and the second part (which may be designated as $X_{17''}$) equals the negative value of the square of the load impedance divided by the load reactance or $$X_{17''} = -\frac{Z^2}{X}$$

The first and constant part ($X_{17'}$) may be directly connected to the output terminals of the potentiometer system whereas the second part is permanently associated with each individual load which it is desired to switch separately. If some of the loads have variable impedances as motors etc. means may be provided to regulate automatically the second part ($X_{17''}$) of reactance 17 so as to be always in accord with the formula.

For variable loads, it may sometimes be convenient to omit the part $X_{17''}$ of reactance 17 associated with the load and to retain only the part $X_{17'} = -X_{16}$ connected across the output terminals of the potentiometer. The voltage across reactance 13 is, in this case, expressed by the formula $$E_{13} = \frac{E_{14}}{Z} X_{16}$$

and is independent of the power factor. The sacrifice in maximum available output is small in case the power factor is near unity.

It is also possible to dimension the reactance 17 in such a way that, for any value of the load, the voltage $E_{12}$ across reactance 12 does not exceed the voltage $E_{11}$ of the source. Equation for $X_{17}$ $E_{12}$ and $E_{13}$ similar to those given above can be derived for this case.

It is obvious that with other adjustments of the reactance 17 than indicated above, control of the step voltages of a different character than indicated may be accomplished. The step voltage control mentioned are considered the most important from the point of view of best utilization and protection of the potentiometer and from the point of view of practicability.

It is also obvious that the above formulas are only strictly correct for potentiometers having no inherent losses and being supplied with alternating current of true sine wave current and with a constant frequency. The influence of losses, harmonics and frequency changes may require slightly different adjustments of reactance 17 than indicated by the formulas, in order to receive the best average results. Deviations from the ideal adjustment require calculations in most cases, and are best determined by test.

Figure 2:
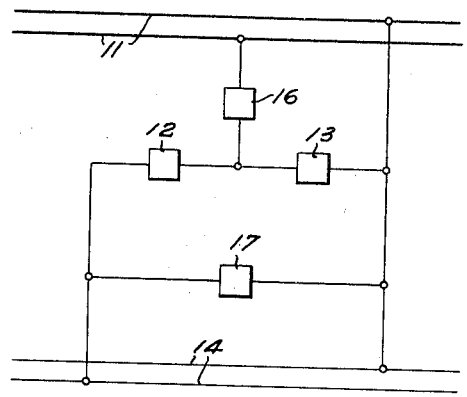

It has been assumed thus far that the voltage of line 11 was considerably higher than the voltage desired in line 14 but such relationship can be reversed, if desired, by suitable choice of the values for the elements 12 and 13. Another method for obtaining the above results consists in inverting the connections between the elements and the two lines as shown in Fig. 2, element 17 however remaining connected with the load side of the potentiometer.

Figure 3:
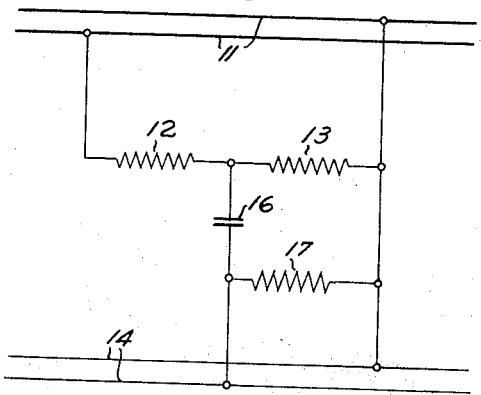

Fig. 3 is an embodiment of the connections generally shown in Fig. 1. It has been assumed that both elements 12 and 13 are inductances and that element 16 is a capacitance, all elements being dimensioned in accordance with the equation set forth above. With the connections shown in Fig. 3 both lines are in phase coincidence and the ratio of the voltage of line 14 to that of line 11 is equal to the ratio of inductance 13 to the sum of inductances 12 and 13. Element 17 may be an inductance as shown or may be a capacitance chosen with a suitable value for limiting the voltage across element 13, 12 or 16 to a predetermined range of values for a predetermined range of current in the potentiometer output circuit.

Figure 4:
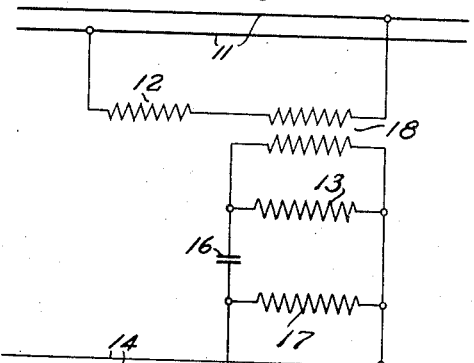

Fig. 4 is a modification of the connections shown in Fig. 3. The element 13 is connected to line 11 through a transformer 18. By suitable selection of the ratio of transformation of the transformer 18, it is possible to make the dimensions of the other elements different from the dimensions required by the connections of Fig. 3, the balance between the different elements being however the same when the ratio of transformation of transformer 18 is taken into account. It may be found desirable in certain applications to introduce transformer 18 at other locations in the potentiometer system such as shown in Figs. 4a, 4b and 4c of the drawings as may be required. It will be noted that the introduction of the transformer 18 does not introduce, into the potentiometer, the disadvantages mentioned above for high voltage transformers. Transformer 18 receives a voltage which is only a fraction of the voltage of line 11 so that it does not require a large amount of insulation, it is economical to build and can be designed so as not to introduce excessive errors into the voltage relations of the potentiometer. In addition to the above advantages, the use of a transformer presents the advantage of insulating the output circuit entirely from the input circuit.

As is well known, a transformer such as shown at 18 will draw, from the supply line, a certain amount of magnetizing current which can be adjusted to any desired value by proper dimensioning of the magnetic circuit of the transformer. In the embodiment shown in Fig. 4, the effect of such magnetizing current is superimposed upon the effect of the magnetizing current of inductance 13 so that it is possible to substitute an equivalent amount of current drawn by the primary circuit of the transformer 18 for the current drawn by the inductance 13 and thereby to eliminate the necessity for the inductance 13. The embodiment thus obtained is diagrammatically shown in Fig. 5 in which inductance 13 is eliminated entirely while the characteristics of the potentiometer remain the same as those of the embodiment shown in Fig. 3.

Figure 5:
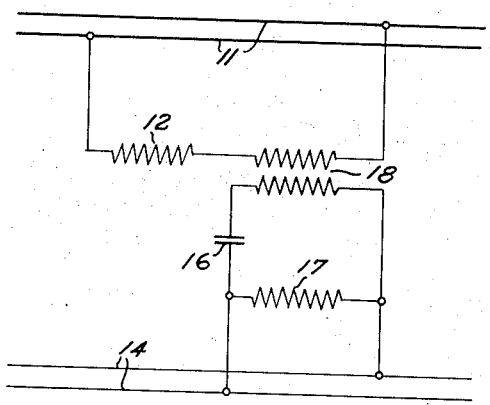

It will be noted, in the embodiment of Fig. 3, that one conductor of line 14 is directly connected to one conductor of line 11 and, in the embodiment shown in Figs. 4 and 5, that the same line conductors should be maintained at substantially the same potential to avoid impressing excessive voltages on the insulation between the windings of transformer 18 which is designed for comparatively low voltages. It will often be desired to have one side of output line 14 approximately at ground potential, whereas the supply line 11 may be a three-phase line with or without a grounded neutral point so that every conductor of the line is at a considerable voltage to ground.

Figure 6:
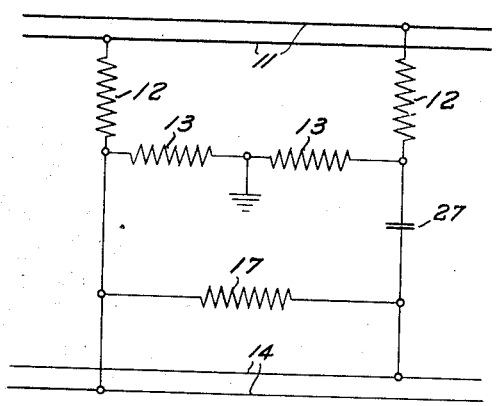
Figure 4:
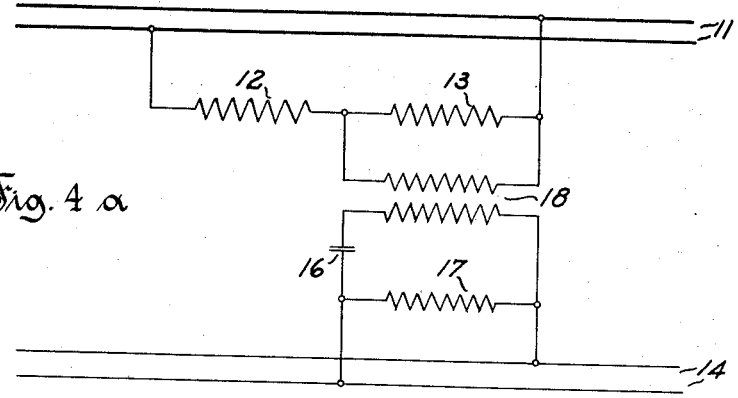
Figure 4:
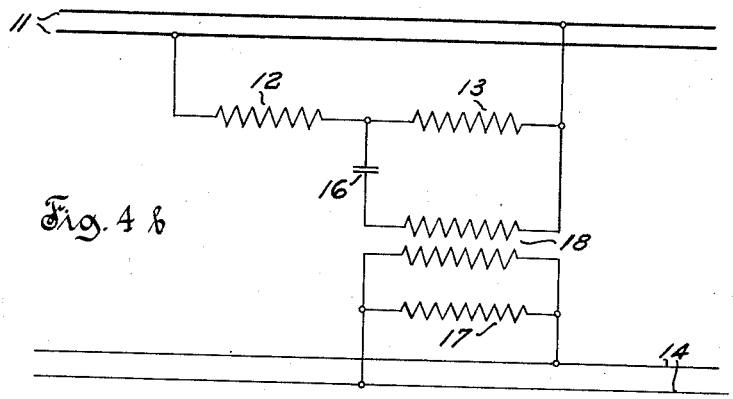
Figure 4:
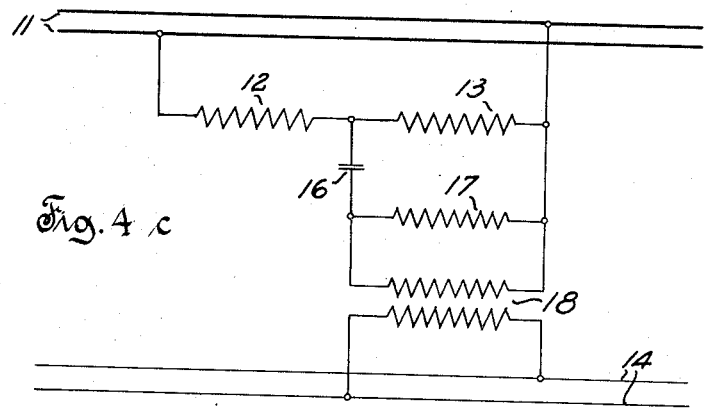

It is possible to reduce the potential of one of the conductors of line 14 to a potential sufficiently close to ground potential by utilizing the connections shown in Fig. 6. When such connection is made two equal elements 12, shown here as inductive reactances, are connected in series across the conductors of supply line 11 through two equal elements 13 here also shown as inductive reactances. The capacitance 27 has a capacitive reactance equal in magnitude to twice the capacitive reactance of element 16 as shown in Fig. 3. Element 17, here likewise shown as a reactance, remains connected across the line 14 for the purpose set forth above.

Figure 7:
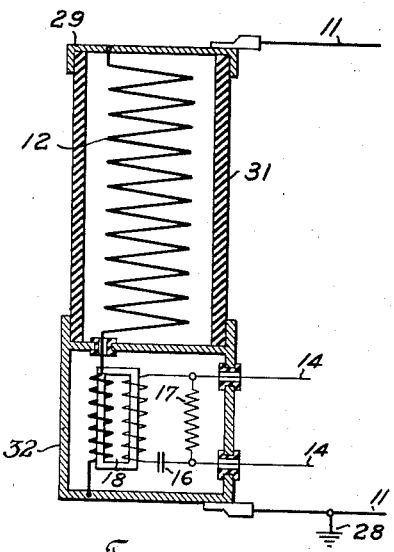

Fig. 7 shows, somewhat diagrammatically, the mechanical construction of a potentiometer built in accordance with the diagram of connections shown in Fig. 5. It is assumed that one side of line 11 is grounded as at 28, the other side being connected through the metallic cover 29 of the potentiometer which cover rests on a shell of insulating material 31 containing the inductance 12. Shell 31 in turn rests on a metallic casing 32 containing transformer 18, condenser 16 and element 17 which shell is provided with outlets for the output line 14. It is assumed that inductance 12 is constructed with an air core, or with an iron core provided with air gaps, and it may be immersed in an insulating fluid retained within the shell 31. One end of the inductance 12 is connected to cover 29 and the other end, which is at a potential close to ground potential, is connected to the transformer 18 through a suitable bushing inserted in the partition between shell 31 and metallic casing 32. Insulation of the high voltage end of inductance 12 is thus obtained by means of insulated shell 31 and the insulating fluid contained therein and can be easily and economically accomplished.

Constructions similar to those shown in Fig. 7 will be obtained for the different possible variations of the diagram of Fig. 1 and Fig. 2. Thus, for instance, if capacitances are used for elements 12 and 13, such capacitances may be constructed as an insulated bushing provided with a layer or layers connected to the other elements by a suitable tap. In the embodiment shown in Fig. 2 it will be necessary to insulate element 17 similarly to the insulation of inductance 12 as shown in Fig. 7.

Figure 8:
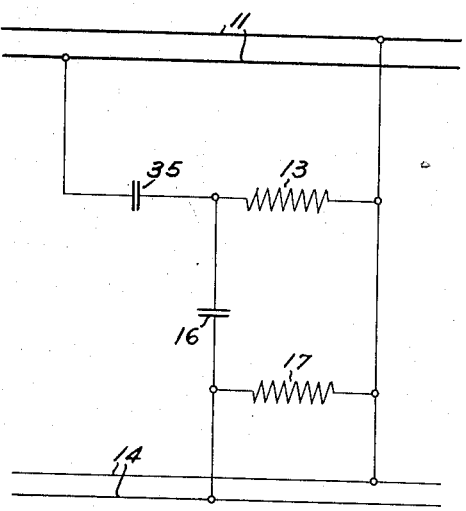
Fig. 8 shows a general diagram of connections for a potentiometer system performing the functions either of a step-up or step-down transformer.

The diagram of connections shown in Fig. 8 illustrates the use of a capacitance 35 in place of the inductance 12 shown in Fig. 3. By the use of such arrangement it is often possible to reduce the cost of the system materially, particularly where small outputs are desired, or as structures now in use, such as leading in bushings of electrical apparatus, or insulator strings may be used to function as the capacity 35.

Figure 9:
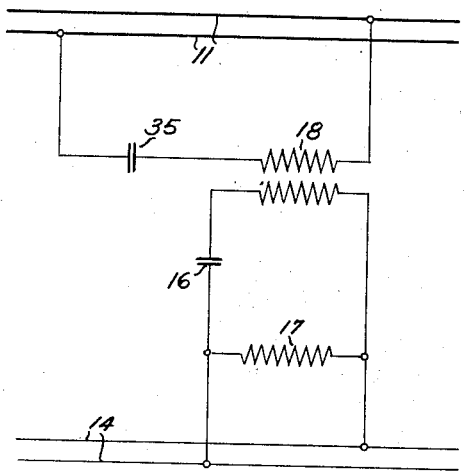
Fig. 9 shows an arrangement similar to that illustrated in Fig. 8 but using a transformer to connect the input and output circuits of the system.

The diagram of connections shown in Fig. 9 shows the use of a transformer 18 for delivering the voltage across inductance 13 (Fig. 8) to the capacitance 16 and the output circuit. The transformer shown is built with a magnetizing current equivalent to the current drawn by inductance 13 (Fig. 8) so that the latter is not required, which results in a considerable reduction of cost and smaller losses.

Figure 10:
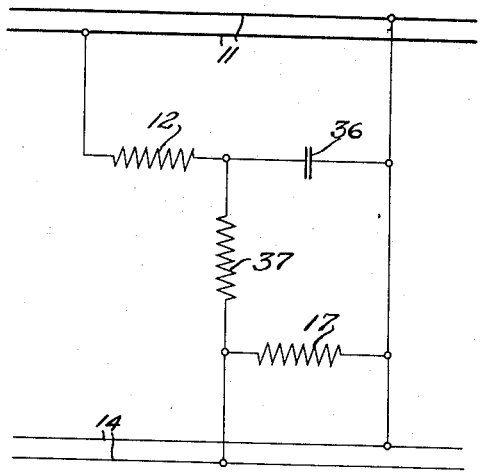
Fig. 10 shows a general diagram of connections for a potentiometer system performing the functions either of a step-up or step-down transformer, but showing different elements connected with the input and output circuits of the system.

The diagram of connections shown in Fig. 10 illustrates the use of a capacitance 36 in place of the inductance 13 and of an inductance 37 in place of the capacitance 16 shown in Fig. 3. Transformers may be connected to the circuits shown on Figs. 8 and 10 in a similar way as shown in connection with the circuits of Fig. 3. The circuits can also be modified for use with a source having both poles insulated in a similar way as shown in Fig. 6 for the circuit of Fig. 3.

Although but a few embodiments of the present invention have been illustrated and described, it will be apparent to those skilled in the art that various changes and modifications may be made therein without departing from the spirit of the invention or from the scope of the appended claims.

The invention claimed is:

1. In a potentiometer system, a source of alternating current, the system including four reactive elements, the relations of three of the elements being such that the product of two of the elements plus the product of one of the first two elements and of the third element plus the product of the other one of the first two elements and the third element equals zero, and an output circuit for the system.

2. In a potentiometer system, a source of alternating current, reactances connected across said circuit to divide the voltage thereof into two portions, an output circuit for the potentiometer system and reactances connecting said first mentioned reactances with said output circuit, one end of said source being directly connected with said output circuit, the relations of three of said reactances being such that the product of two of the same plus the product of one of said reactances and of a third reactance plus the product of the other of the first mentioned reactances and the third said reactance equals zero.

3. In a potentiometer system, a source of alternating current, a plurality of inductances connected across said source to divide the voltage thereof into two portions, an output circuit for the potentiometer system, and a capacitance connecting said inductances with said output circuit, one end of said source being directly connected with said output circuit.

4. In a potentiometer system, a source of alternating current, inductances connected across said source to divide the voltage thereof into two portions, an output circuit for the potentiometer system, a capacitance connecting a point between said inductances with said output circuit, one end of said source being directly connected with said output circuit, and a reactance connected across the connections of said first mentioned inductances with said output circuit.

5. In a potentiometer system, a source of alternating current supply, a reactance connected with said source, a second reactance connected in series with said first reactance and with said source, an output line, one terminal of said second reactance being connected with said output line, a third reactance connected between the first two said reactances and with said output line, and a fourth reactance connected across the connections with said output line, the relation of the first three said reactances being such that substantially constant ratio and phase angle are ob- 6. In a potentiometer system, a source of alternating current supply, a reactance connected with said source, a second reactance connected in series with said first reactance and with said source, an output line, one terminal of said second reactance being connected with said output line, a third reactance connected between the first two said reactances and with said output line, and a fourth reactance connected across the connections with said output line, the relation of the first three said reactances being such that substantially constant ratio and phase angle are obtained between said source and said line for different values of load impedance, the relation of the fourth said reactance to the third said reactance and to the impedance of said line being such that the voltage across the second said reactance is a minimum for each value of the impedance of said line.

7. In a potentiometer system, a source of alternating current supply, a reactance connected with said source, a second reactance connected in series with said first reactance and with said source, an output line, one terminal of said second reactance being connected with said output line, a third reactance connected between the first two said reactances and with said output line, and a fourth reactance connected across the connections with said output line, the value of the fourth said reactance being the negative product of the third said reactance with the square of the impedance in said line divided by the sum of the square of the impedance of said line and the product of the third said reactance with the reactance of said line, inductive reactances being taken with the positive sign and capacitive reactances being taken with the negative sign.

8. In a potentiometer system, a source of alternating current supply, a reactance connected with said source, a second reactance connected in series with said first reactance and with said source, an output line, one terminal of said second reactance being connected with said output line, a third reactance connected between the first two said reactances and with said output line, and a fourth reactance connected across the connections with said output line, the fourth said reactance being divided into a plurality of portions, one of the portions being equal to the negative value of the third said reactance and the other portions being equal to the negative square of the impedance divided by the reactance of said line.

9. In a potentiometer system, a source of alternating current supply, a reactance connected with said source, a second reactance connected in series with said first reactance, and with said source, an output line, one terminal of said second reactance being connected with said output line, a third reactance connected between the first two said reactances and with said output line, and a fourth reactance connected across the connections with said output line, the relation of the fourth said reactance to the impedance of said line being such that the voltage across the first said reactance is limited to the voltage of said source.

10. In a potentiometer system for transforming voltages, an alternating current supply line, means connected across said line to divide the voltage thereof into two portions, a transformer inductively connected with said means, an output line for the system, and a capacitance connected with said transformer and with said output line forming a path for the supply of one portion of the voltage of said supply line to said output line.

11. In a potentiometer system for transforming voltages, an alternating current supply line, an inductance having one terminal connected with said line, a transformer connected with said inductance and with said line, an output line for the potentiometer system, and a capacitance connected with said transformer and with said output line forming a path for the supply of a portion of the voltage of said supply line to said output line.

12. In a potentiometer system for transforming voltages, an alternating current supply line, an inductance having one terminal connected with said line, a transformer connected with another terminal of said inductance and with said line and transforming a portion only of the voltage of said line, the primary winding of said transformer being connected in series with said inductance across said line, an output line for the potentiometer system, and a capacitance connected with said transformer secondary winding and with said output line forming a path for supplying the voltage transformed by said transformer to said output line.

13. In a potentiometer system for transforming voltages, an alternating current supply line, an inductance connected at one end with said line, a transformer connected with said inductance and with said line to transform a portion of the voltage therein, an output line for the potentiometer system, a capacitance connected with one end of the secondary winding of said transformer and with said output line, the other end of the secondary winding of said transformer being directly connected with said output line, and a reactance connected across the secondary winding of said transformer.

14. In a potentiometer system, an input circuit providing a source of alternating current, an output circuit, means comprising an inductance element and a capacitance element, means for so connecting the first said means with said circuits that voltages are impressed on said output circuit from said input circuit, and means connected with said output circuit for controlling the range of voltages impressed upon the respective elements of the first said means in dependence upon the output circuit load.

15. In a potentiometer system, an input circuit providing a source of alternating current, an output circuit, a plurality of reactive elements, means for so connecting three of said elements with said circuits that voltages are impressed on said output circuit from said input circuit differing in magnitude from the voltages of said input circuit, and means for connecting a fourth of said elements with said circuits so as to control the range of voltages impressed upon each of said three elements in dependence upon the output circuit load.

16. In a potentiometer system, an input circuit providing a source of alternating current, a plurality of reactive elements, means for so connecting three of said elements with said circuits that voltages are impressed on said output circuit from said input circuit differing from the voltages impressed on said input circuit, the said three elements being so dimensioned and connected as to control the ratio and the phase coincidence of the voltages of the output circuit with respect to the voltages of the input circuit, and means for connecting a fourth of said elements across said output circuit so as to control the range of voltages impressed upon each of said three of said elements in dependence upon the output circuit load.

17. In a potentiometer system, an input circuit providing a source of alternating current, an output circuit, a plurality of reactive elements, means for so connecting three of said elements with said circuits that voltages are impressed on said output circuit from said input circuit differing from the voltages impressed on said input circuit, the said three elements being so dimensioned and connected as to control the ratio and the phase coincidence of the voltages of the output circuit with respect to the voltages of the input circuit and independently of the output circuit load, and means connecting a fourth of said elements across said output circuit so as to control the range of voltages impressed on each of said three of said elements in dependence upon the output circuit load.

OTTO NAEF.